(Model.)

C. R. BRINCKERHOFF.
GLEANER AND BINDER.

No. 267,400. Patented Nov. 14, 1882.

Witnesses:
W. M. Rebasz Jr.
H. G. Phillips

Inventor:
Cornelius R. Brinckerhoff,
by Geo. B. Selden,
Atty.

UNITED STATES PATENT OFFICE.

CORNELIUS R. BRINCKERHOFF, OF ROCHESTER, NEW YORK, ASSIGNOR OF ONE-HALF TO BAYARD RICHMOND, JAMES H. RICHMOND, AND PARIS G. CLARK, ALL OF SAME PLACE.

GLEANER AND BINDER.

SPECIFICATION forming part of Letters Patent No. 267,400, dated November 14, 1882.

Application filed October 30, 1880. (Model.)

*To all whom it may concern:*

Be it known that I, CORNELIUS R. BRINCKERHOFF, of the city of Rochester, in the county of Monroe, New York, have invented an Improved Grain Gleaner and Binder, which I have designated the "Farmer's Sulky-Binder," of which the following is a specification, reference being had to the annexed drawings, in which—

My invention relates to that class of grain-binders commonly known as "gleaners," by which the grain, having been cut and delivered in gavels by a harvester, is picked up from the ground, bound with cord, and discharged in rear of the machine.

My improved grain gleaner and binder is represented in the accompanying drawings, in which A is the frame of the machine; B, the main driving-wheel; H H, the teeth for picking up the gavel; F, the intermittingly-rotating reel or gaveler; I, the needle-bar or binding-arm, and K the case containing the knot-tyer.

Figure 2:
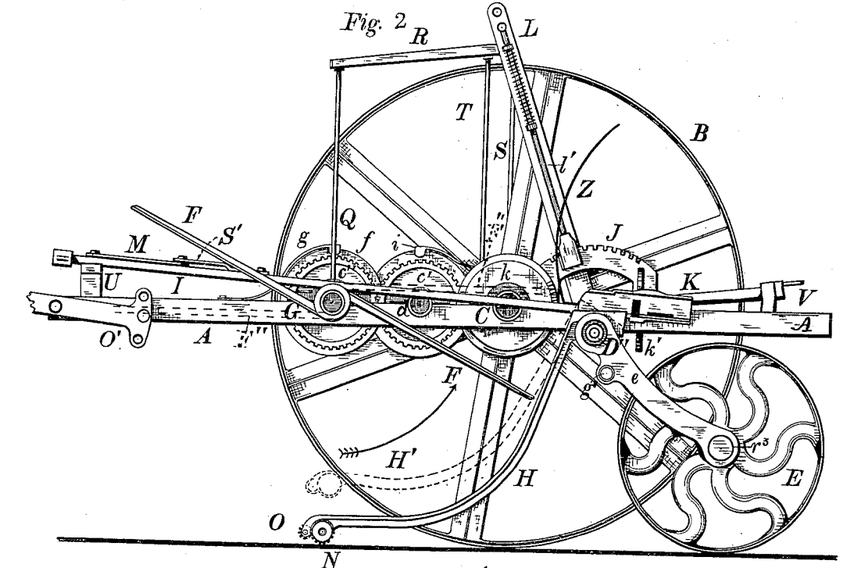
Fig. 2 is a side elevation of the same.
Figure 6:
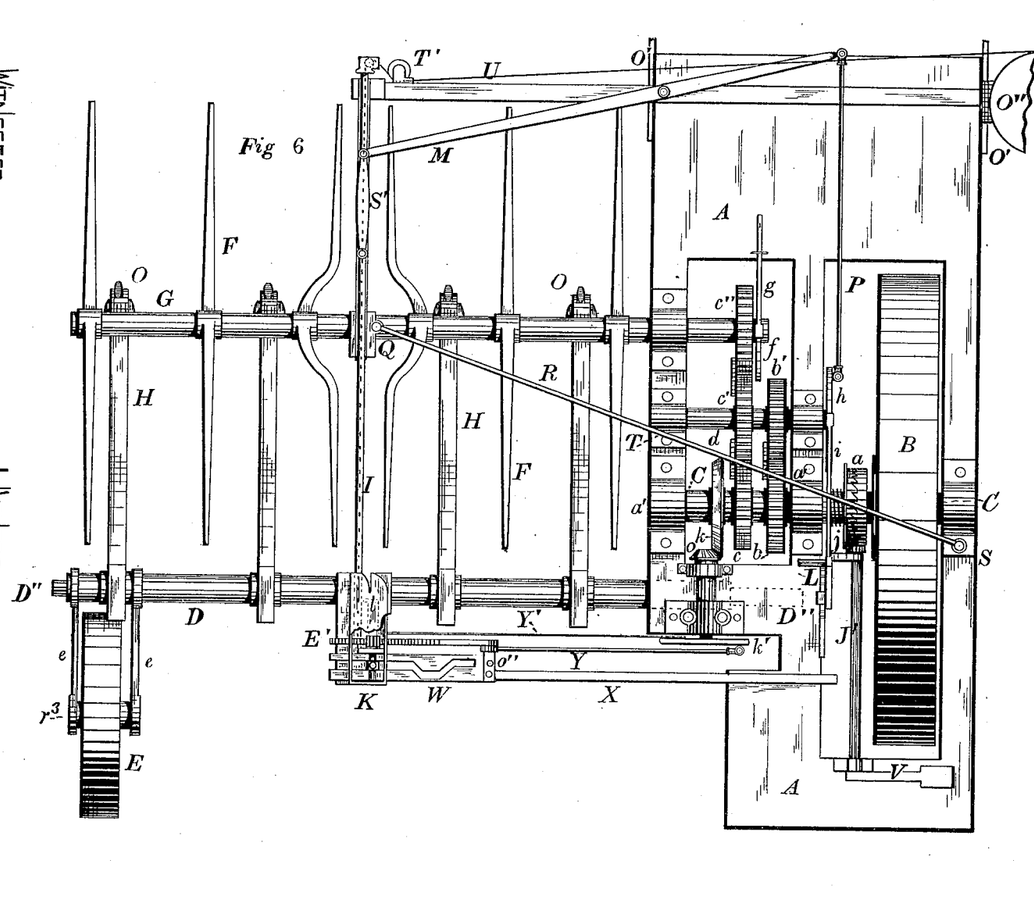
Fig. 6 is a plan view of my improved grain gleaner and binder.

The machine is supported on the driving-wheel B and ground-wheel E, provision being made for the attachment of thills to the forward end of the frame, at O' O', Figs. 2 and 6. The driving-wheel B is loose on the main shaft C, being arranged to be connected or disconnected therewith by means of the rock-shaft J', which is supported in suitable bearings on the frame, and provided at its inner end with an arm projecting downward and carrying a roller, which bears against the flange of the sliding portion of the clutch, which is forced toward the driving-wheel by the spring $j$. The rock-shaft is provided at its outer end with a pedal, V, by which the clutch is operated.

The supporting-rod D, on which the teeth H are pivoted so as to swing independently of each other, is rigidly attached to the frame of the machine immediately behind the main shaft. The rod D is hollow, and through it passes a rock-shaft or tube, D", to which the hand-lever L is fastened at its inner end, while its outer end projects beyond the rod or tube D, and carries the arm or arms $e$ on a stud, $r^3$, in the outer end of which the ground or carrying-wheel E revolves.

Below the rod D, and parallel therewith, is placed the lifting-rod $g'$, Figs. 1 and 2, which is fastened at its outer end to the arm $e$ and at its inner end to a downward extension of the hand-lever L. By drawing the hand-lever back toward the rear of the machine the ground-wheel E is forced forward, thereby elevating the outer end of the rod D and swinging the rod $g'$ into contact with the lower sides of the teeth H, by which the latter may be elevated from the ground, as represented by the dotted lines H' in Fig. 2, for the purpose of passing over stones or other obstacles. The hand-lever L is provided with a sliding spring-catch, $l'$, which engages with the notches of the segment J, attached to the frame A, so that the teeth may be fastened at any desired degree of elevation from the ground. On releasing the hand-lever the teeth fall to the ground automatically of their own weight. The teeth are loosely attached to the rod D at their upper end, so that they may swing on it each independently of the other, for the purpose of allowing the points of the teeth to adjust themselves automatically to the irregularities of the ground over which they are passing. The teeth are held separate from each other at the proper relative distances by collars or thimbles carried on the rod D.

Figure 1:
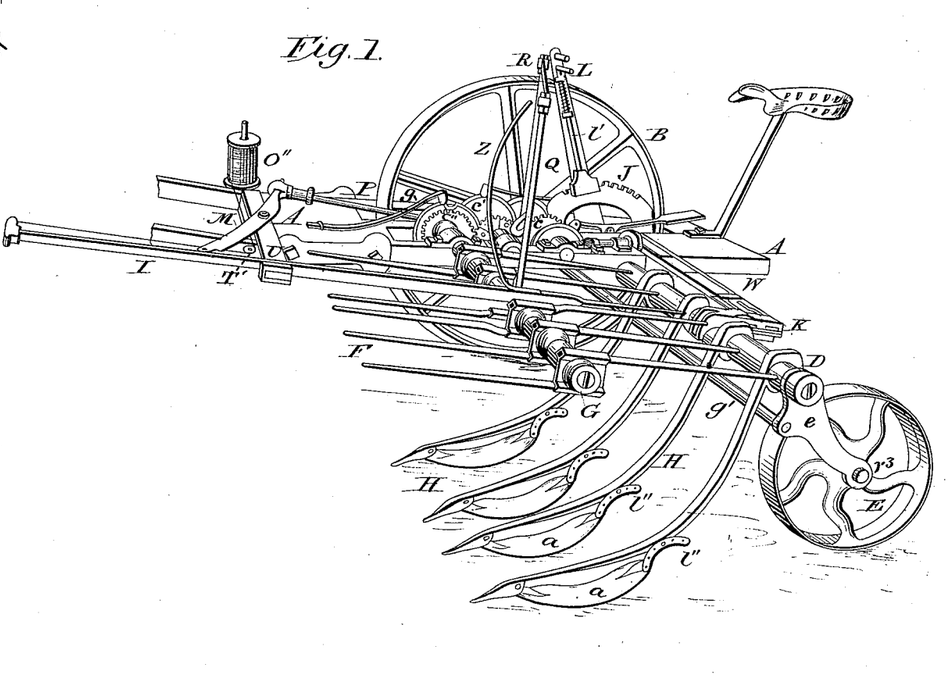
Figure 1 is a perspective view of my improved grain gleaner and binder.

In Fig. 1 I have represented the points of the teeth as provided with a curved shoe, $a$, pivoted to the under side of the tooth at its forward end and connected to it at its rear end by a link, $l''$. The link serves the purpose of adjusting and supporting the shoe at any desired distance from the lower side of the tooth. The link is attached to the rear end of the shoe by a pin or bolt, and it is provided with a series of holes, through which it is bolted to an eye on the tooth.

Figures 3, 4, 5, 31, 32, 33:
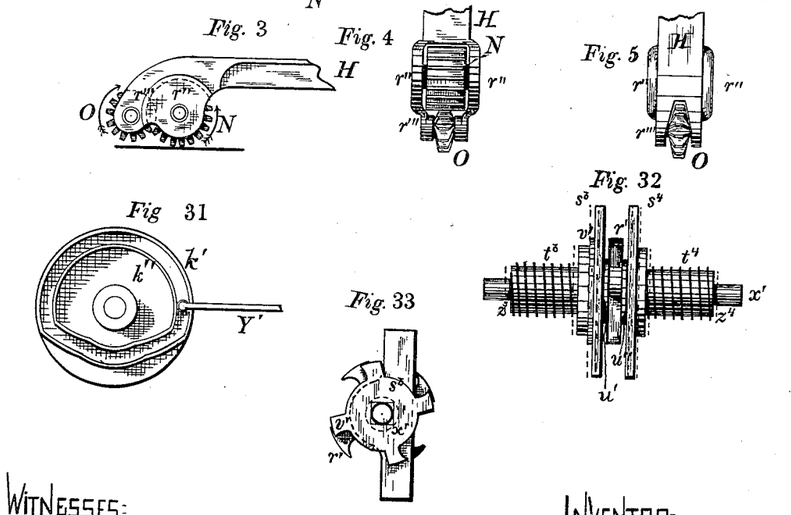
Fig. 3 is a side view of the point of a grain elevating tooth.
Fig. 4 shows the lower side of the same.
Fig. 5 is a plan view of the same.
Fig. 31 shows the cam-wheel for operating the cord cutter and holders.
Fig. 32 is a side view of a modification of my improved cord-holder.
Fig. 33 is an end view of the same.

In Figs. 2, 3, 4, 5, and 6 I have represented the points of the teeth as provided with revolving wheels adapted to picking up the grain from the ground. A suitable recess is formed in the point of the tooth, through which pass the studs $r''$ $r'''$, on which the spur-wheels N and O revolve. The wheel N runs on the ground, and, in consequence of the forward motion of the machine, receives from it a rotary motion, as indicated by the arrow in Fig. 3, which motion, being transmitted to the wheel O, with which the wheel N meshes, causes it to revolve in the contrary direction. The teeth of the spur-wheel O project beyond the forward extremity of the tooth H, and, in consequence of their upward movement, pick up the grain from the ground and elevate it onto the point of the tooth. I prefer to make the wheel N wider than the wheel O, and the point of the tooth H may in this case be made with a wide recess, as shown in Figs. 4 and 5.

The intermittingly-rotating reel or gaveler F, by which the grain is carried up the curved teeth H into position to be bound, is operated from the main shaft C by the gears $c\ c'\ c''$, Figs. 2 and 6. The gear $c$ is fast on the main shaft, but the gear $c'$ is an idler running loose on the shaft $d$, and meshing with the gear $c''$ on the inner end of the shaft G, which carries the reel F. The gears $c\ c'$ are mutilated, and provided with suitable guide-cogs on their sides, so that the shaft G makes but half a revolution to each revolution of the main shaft. The disk $f$ on the shaft G has notches cut in its edge diametrically opposite each other, into which the spring or pawl $g$, Figs. 2 and 6, provided with a friction-roller, snaps at the completion of each half-revolution, for the purpose of holding the gaveler in the proper position during the operation of binding the bundle. The arms of the gaveler are offset on each side of the center of the shaft G, as represented in Figs. 1 and 2, for the purpose of raising the bundle above the path of the needle-bar I, so that the latter may pass under the grain, the position of the gaveler during the operation of tying the knot being represented by the dotted lines F'', Fig. 2.

The needle-bar I is operated from the main driving-shaft by the gears $b\ b'$, crank $h$, pitman P, lever M, and link S', Fig. 6. The needle-bar slides horizontally in a suitable guide extending from the shaft G forward to the supporting-bar U. The crank and lever are so proportioned that the point of the needle-bar enters the knot-tyer case a sufficient distance at one end of its travel and at the other end recedes far enough away from the knot-tyer to permit of the elevation of the gavel between it and the knot-tyer by the reel F. The gears $b$ and $b'$ are mutilated and so arranged that the needle-bar does not commence its motion until the reel F has completed its half-revolution. The crank $h$ is on a disk having a notch in its edge, into which the spring-stop $i$ engages.

Figures 9, 10, 11:
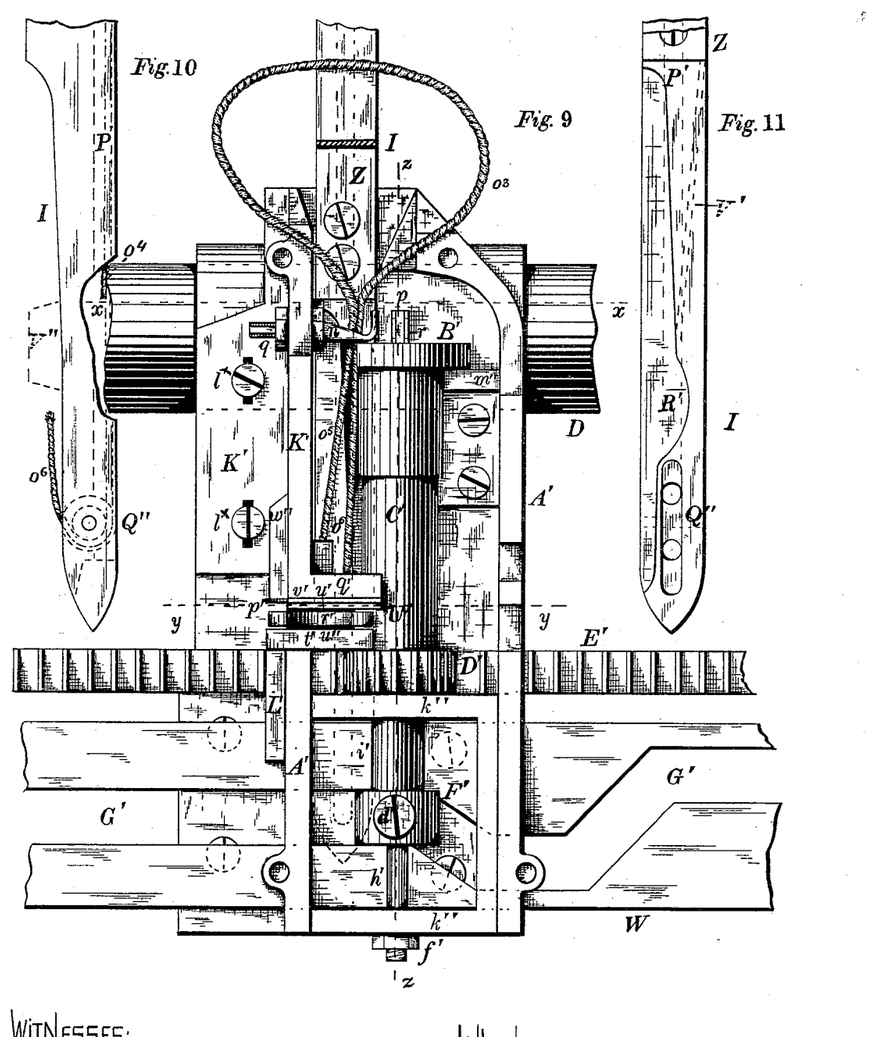
Fig. 9 is a plan view of the knot-tyer.
Fig. 10 is a side view of the point of the needle-bar or binder-arm.
Fig. 11 is a plan view of the same.
Figure 20:
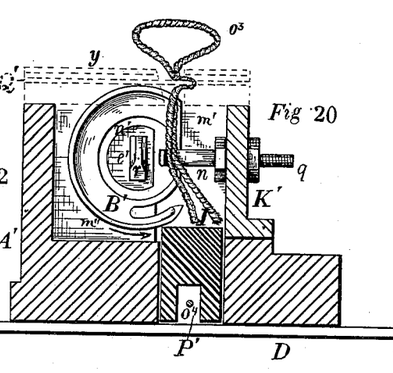
Fig. 20 is a tranverse section through the knot-tyer on the line $xx$, Fig. 9, showing the rotating hook in elevation.
Figures 21, 23, 24, 25, 26, 27, 28, 29, 30:
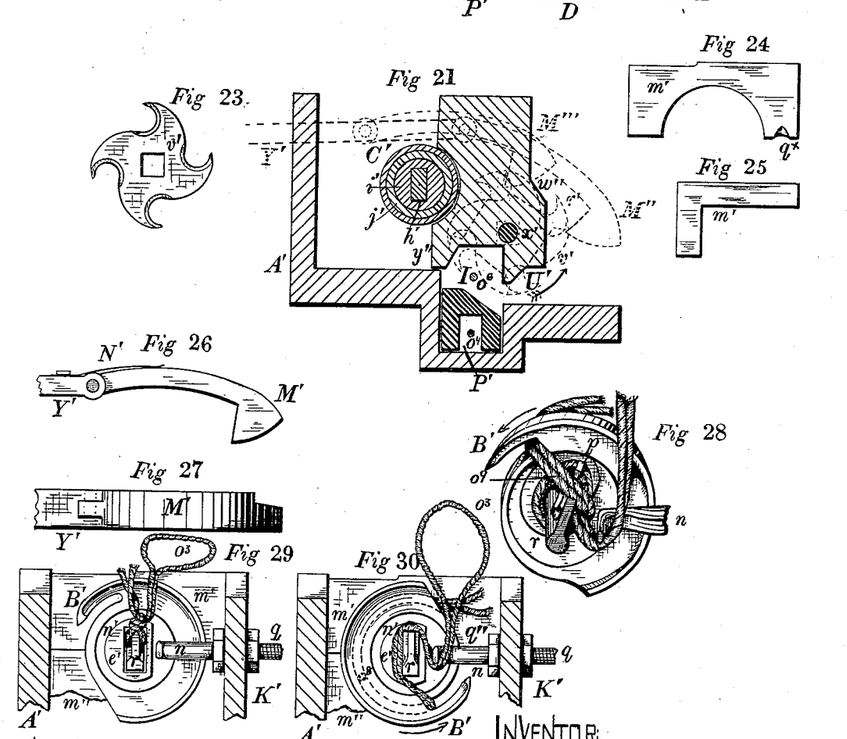
Fig. 21 is a tranverse section through the knot-tyer on the line $y\,y$, Fig. 9.
Fig. 23 is a side elevation of the cord-cutter.
Figs. 24 and 25 are views of the plate placed immediately behind the rotating hook.
Fig. 26 is a side view of the hook which operates the cord holder and cutter.
Fig. 27 is a plan view of the same.
Fig. 28 is a perspective view of the knot-tyer in the operation of forming the knot.
Figs. 29 and 30 represent different phases in the formation of the knot.
Figure 22:
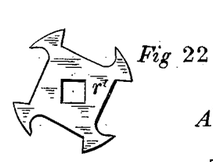
Fig. 22 is a side elevation of the cord-holder.

A groove, P', is formed in the needle-bar for the passage of the cord $o^4$, Figs. 10, 20, and 21. The cord passes from the reel O'', Figs. 1 and 6, around a pulley, T', and thence around a roller, which may be provided with a tension device in the forward end of the needle-bar.

The knot-tyer is operated from the main driving-shaft by means of the mutilated bevel-gear $k$, bevel-pinion $o$, crank-disk $k'$, and pitman Y, which gives a reciprocating motion to the sliding rack E' and the cam-bar W, by which the knot-tying mechanism is actuated. A rod, Y', Fig. 6, operated by the cam $k''$, Fig. 31, on the inner side of the crank-disk $k'$, Fig. 6, imparts motion to the cord cutter and holder.

A sliding bar, X, Fig. 6, rigidly secured to the cam-plate W, serves to guide the latter and hold it in place during its reciprocation, said bar X sliding in a way made for it on the frame of the machine.

It is obvious that the operation of the knot-tyer must be so timed with reference to the motion of the needle-bar that the formation of the knot will take place immediately after the needle-bar has brought the cord under the bundle into the knot-tyer.

The knot-tyer is provided with a suitable casing K A', inclosing the working parts, and provided on its lower side with a half-socket fitted to the upper side of the rod D. Below the rod D a suitable cap, secured to the casing A' by bolts, one of which is shown at $x'$, Fig. 7, serves to hold the knot-tyer in place.

Figure 7:
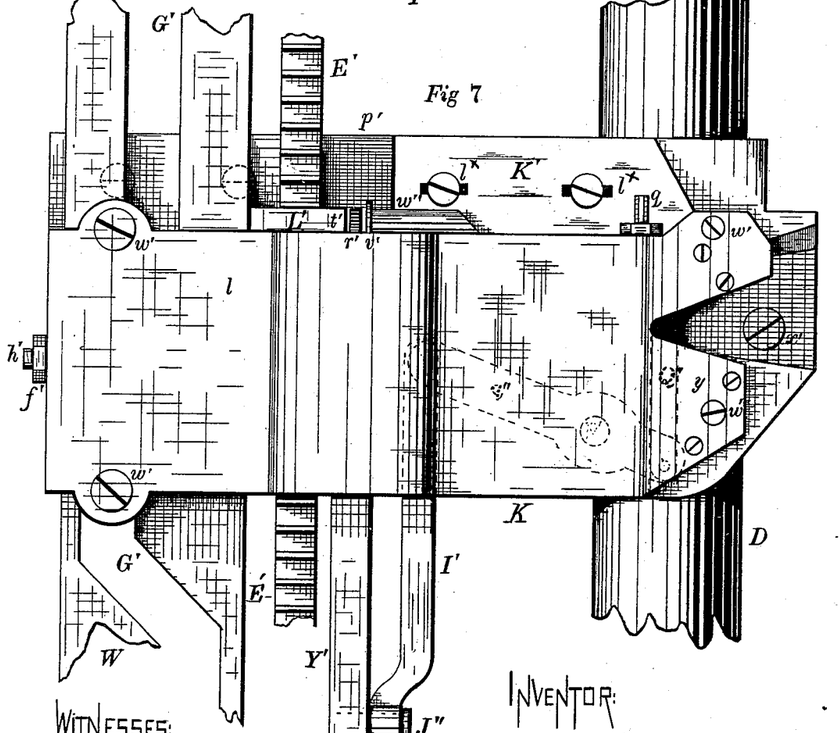
Fig. 7 is a plan view, on an enlarged scale, of the knot-tyer case.
Figure 8:
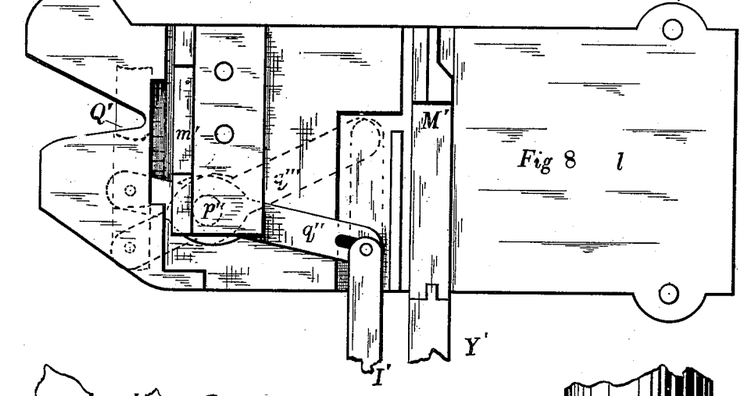
Fig. 8 is a reversed view of the knot-tyer cover.

The knot-tyer casing is provided with a suitable longitudinal channel for the reception of the point of the needle-bar I, as shown in Figs. 9, 20, and 21. The sides of the casing are also provided with suitable openings for the passage of the cam-plate W, the rack E', and the rods l' Y', which operate the cord cutter and holder. The entrance to the channel in which the needle-bar plays is flaring sidewise, to insure the admission of the point of the needle, as shown in Figs. 7 and 9. The cap $l$, covering the knot-tyer, is notched immediately above the entrance to the needle-bar channel, in order to permit the cord to be brought within the grasp of the upper holder, Q'. (See Figs. 7 and 8.)

The knot-tyer consists of the rotating hook B', a stationary hook, $r$, provided with a movable latch, $p$, the rotating cord-holder $r'$, and the rotating cord-cutter $v'$. Rotary reciprocating motion is imparted to the hook B' by the rack E', meshing with the pinion D'. The latch $p$ is operated by the sliding cam-plate W, which causes the sleeve $i'$ to move to and fro within the hollow spindle C' of the rotary hook B'. The cord-holder $r'$ and cutter $v'$ receive an intermittent rotary movement from the hook M', pivoted to the end of the rod Y'. The upper cord-holder, Q', is caused to reciprocate in a slot between the plate $y$ and the cap $l$ by means of the lever $q''$, Fig. 8, pivoted at $p''$ to the under side of the cap, and connected at its inner end with the bar I', jointed to the rod Y' at J'', Fig. 7.

Figures 17, 18, 19:
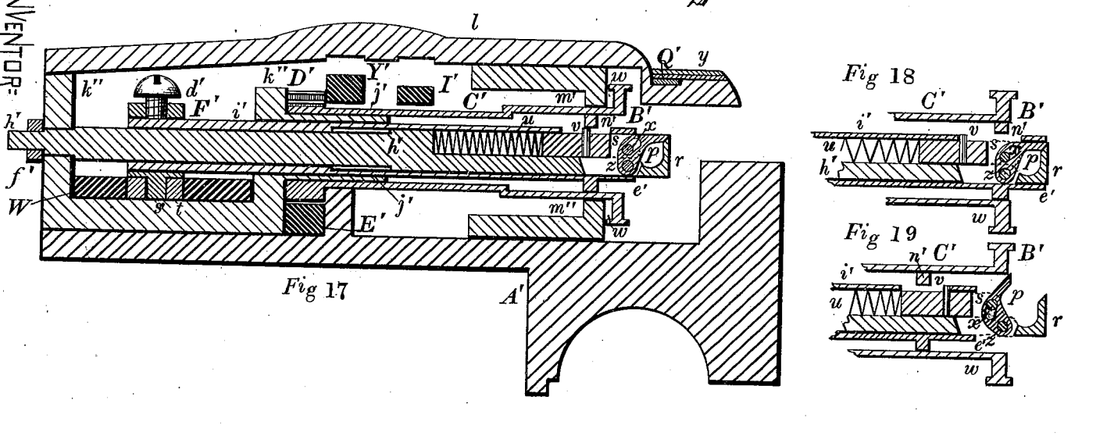
Fig. 17 is a central longitudinal section of the knot-tyer and its case on the line $z\,z$, Fig. 9.
Figs. 18 and 19 are central longitudinal sections through the front end of the knot-tyer, showing different positions of the parts.

The hollow spindle C' of the rotating hook B' is supported on a hollow stud, $j'$, Fig. 17, extending forward from the inner casing, $k''$, which is bolted to the main casing A' at its rear end. The rod $h'$, which passes centrally within the hollow spindle C' and carries the stationary hook $r$ and the latch $p$, is fastened to the outer end of the inner casing, $k''$, by a nut, $f'$. The sleeve $i'$ slides within the hollow stud $j'$.

At its front end, and in rear of the hook $r$ and the latch $p$, the rod $h'$ is cut away to afford space for the slide $s$, Figs. 17, 18, and 19, to the forward end of which, in a suitable slot, the latch $p$ is attached by a pin, $x$, passing through a slot in the latch of sufficient length to permit the swinging motion of the latch, as represented in Fig. 19.

The latch is pivoted to the bar $h'$ in a slot on a pin, $z$, Figs. 17, 18, and 19. A pin, $v$, extends outward from the slide $s$, and passes through a slot in the sleeve $i'$, which, near its forward end, is provided with a collar, $n'$, sliding freely within the sleeve C'. A spring, $u$, between the end of the slide $s$ and the bar $h'$, holds the latch $p$ closed against the hook $r$, as shown in Figs. 17 and 18, except when the latch is opened (see Fig. 19) by the sliding motion of the sleeve $i'$, the end of the slot in which, coming in contact with the pin $v$, draws the slide $s$ backward, compressing the spring $u$ and opening the latch $p$.

A cord-guiding groove, $w$, Figs. 17, 18, and 19, is formed in the rear side of the hook B', through which groove the ends of the cord are compelled to travel during the operation of forming the knot by the plates $m'$ $m''$, attached respectively to the cap $l$ and the bottom of the recess in the casing A', in which the knot-tying mechanism is located. These plates are provided with a curved opening, as shown in Fig. 24, for the reception of the spindle C', and they serve to hold its forward end steady during its rotation. A notch, $q^x$, is made in the lower margin of the plate for the passage of the cord.

The side plate, K', Fig. 9, which is adjustably attached to the casing A' by means of screws $l^x$ $l^x$, passing through slotted holes, carries the hook $n$, which projects inward across the face of the rotating knotting-hook B', and assists in the formation of the knot. The shank $q$ of the hook $n$ is flattened and made adjustable in a slot in the side plate, K', by means of jam-nuts. (See Fig. 20.)

Figures 15, 35:
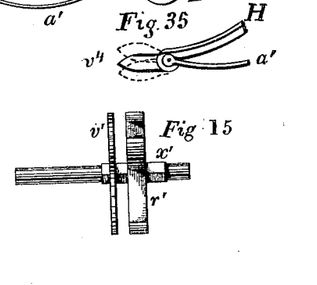
Fig. 15 is a side elevation of the cord holder and cutter and the spindle which supports them.
Fig. 35 represents a modified construction of the point of the grain-elevating teeth.
Figure 16:
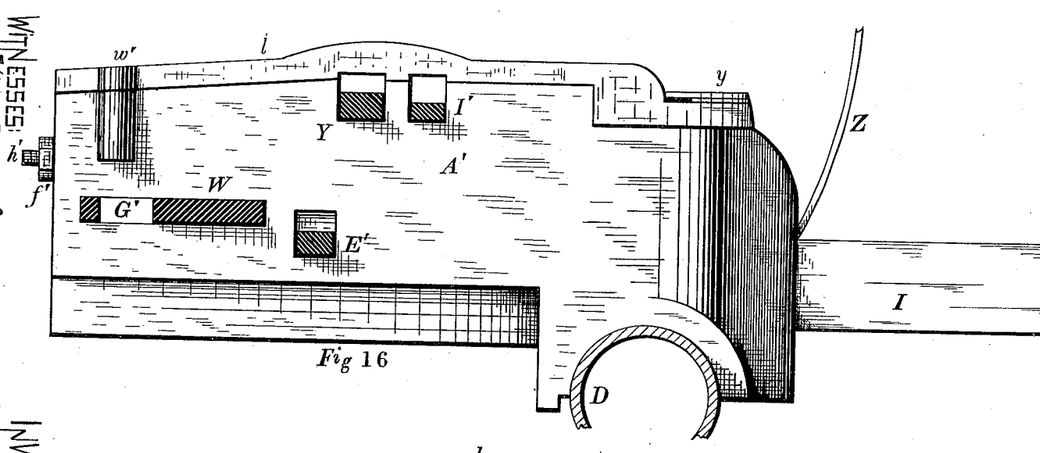
Fig. 16 is a side elevation of the knot-tyer case as seen from the right hand in Fig. 9.

The cutter $v'$ and holder $r'$ are both attached to the same spindle, $x'$, Fig. 15, which is preferably made square in the center of its length, and fits holes of corresponding shape in the cutter and holder. The relative positions of the centers of the rotating spindle C' and the cutter and holder spindle $x'$ are shown in Fig. 21, the latter being so located that the cord $o^6$ is brought by the needle-bar within the path of rotation of the points of the cutter and holder. The point of the needle-bar is shown in Figs. 10 and 11, being sloped downward, as shown in the side view, Fig. 10, and beveled sidewise, as shown in Figs. 11 and 21, for the purpose of permitting the rotation of the cutter and holder and insuring the grasp of the cord by the holder and cutter.

The needle-bar is provided near its point with a roller, Q'', about which the cord passes, coming upward from the groove P' in the lower side of the needle-bar. The cord is brought into the knot-tyer casing by the needle-bar, and opposite the cutter and holder occupies the position $o^6$, Figs. 9 and 21. The cutter and holder, operated from the cam $k''$, Fig. 31, by the rod Y', Fig. 6, and hook M', engaging with one of the points of the holder, make a partial rotation, by which the cord is cut off and its end firmly secured between the sides of the holder and the plate U' and jaw $z'$, Figs. 12, 13, and 14. In rotating, the cutter $v'$ severs the cord against the edge of the lower projecting portion of the plate U', which is sharpened for this purpose. The position of the cord between the cutting-edges is represented at $o^7$, Fig. 13.

In order to insure that the cord shall come within the grasp of the cutter and holder, an inclined rib, V′, Fig. 11, may be placed on the upper side of the needle-bar. The needle-bar now recedes from the knot-tyer, the end of the cord being firmly held between one of the points of the holder and the plate U′ and arm z′. The gavel is brought up by the rotation of the reel F, pressing the grain against the cord and drawing enough of it from the spool O″ to form a band. The needle-bar now advances under the gavel, encircling it with the cord and bringing both ends of the band within the path of rotation of the cutter and holder, by which they are severed, the end reaching toward the needle-bar being caught between the holder and the plates on each side thereof, while the short portion of cord previously held by the holder is thrown out at $p'$, Fig. 9, where a perforation may be made through the casing of the knot-tyer to permit the short pieces to drop out of the way. Immediately before the cutting of the cords the ends of the band, where they pass through the notch in the cap of the knot-tyer, are clamped by the upper holding-jaw, Q′, which is moved transversely by the lever $q''$ and pitman I′ between the upper surface of the knot-tyer cap and the plate $y$, recured thereto. The position of the upper holder, Q′, and the lever $q''$ when the cord is not engaged thereby is shown by dotted lines $q'''$ in Fig. 8. The cord is held by the holder Q′ by being forced sidewise and pinched between the cap and the plate $y$, as shown in Fig. 20. The bundle is now encircled by the band, which is firmly held by the upper holder, Q′, immediately above the rotating knotting-hook B′ and below the bundle, and the ends of the cord have been cut by the cutter. The next operation is the formation of the knot. The cords pass under the stationary hook $n$ and extend backward along the upper surface of the needle-bar to the cutter and holder. The rotating looping-hook B′ commences to rotate and engages the cord just below and behind the hook $n$, at or near the same time as the cords are cut. Continuing to rotate in the left-hand direction, the hook B′ winds the cords around the hook $r$, as shown in Fig. 30, the free ends of the cords being also wound about the spindle C′, as shown by the dotted lines $o^8$, Fig. 30, in the groove $w$ on the rear side of the hook. (See Fig. 17.) The hook B′ continues to rotate, and the latch $p$, being drawn backward or opened by the cam-plate W, sliding the sleeve $i'$ lengthwise, (see Fig. 19,) forces the cords immediately outside of it outward and backward, so that the continued rotation of the hook B′ crosses the cords on themselves and brings the cords $o^9$, Fig. 28, outside the point of the latch and between it and the hook $r$. By the closing of the latch against the hook $r$, the cord to form the loop of the knot is firmly held. The closing of the latch is effected by the continued movement of the cam-plate, the groove G′ in which is so shaped as to push the forward end, $e'$, of the sleeve $i'$ up to the extremity of the hook $r$, (see Fig. 18,) by which the cord which encircles the hook and latch is forced off the hook, while the loop of the knot is held between the hook and the latch, thereby completing the formation of the knot. The grasp of the upper holder on the cord is now released, and the finished knot (see Fig. 29) is allowed to slip from the hook by the opening of the latch, caused by the reverse motion of the cam-plate W.

In order to reduce the slack as much as possible and to tie the knot close up to the bundle, the end $e'$ of the sleeve $i'$ may be forced a short distance beyond the hook, in which case the knot will be drawn up tighter to the bundle, and the opening of the upper holder, Q′, should be timed a little earlier.

In order to compress the bundle and force it to occupy a position nearly over the knot-tyer during the operation of forming the knot, I attach to the needle-bar a spring-compressor, Z, which extends upward to a suitable distance to accomplish the desired result. Upon the release of the knot from the hook by the opening of the latch, the bundle of bound grain is discharged from the machine (being assisted by the spring-compressor Z and secured by the rotation of the reel F) in rear of the knot-tyer and rod D.

The knot-tyer, cam-plate W, and connections Y and Y′ may be covered by a suitable table or platform attached to the rod D. After the formation of the knot and the discharge of the bound bundle the needle-bar again recedes from the knot-tyer, the cord extending from its point into the knot-tyer in position to encircle the grain brought up by the next semi-rotation of the gaveler-reel F. The stationary hook $n$ assists in the formation of the knot by preventing the cords which pass around it from below upward from being drawn out of the path of the rotating knotting-hook by the strain caused by the bundle of grain.

In Fig. 9 the position of the parts when the needle-bar has completed its entrance into the knot-tyer case is represented, the cord $o^5$ being caught by the holder, and the cord $o^6$, after having formed the loop $o^3$, which encircles the bundle, having been brought into the knot-tyer case by the point of the needle-bar in position to be grasped by the cutter and holder.

As the cam-plate W and rack E′ are driven from the crank $k'$, which makes one complete revolution for each knot, it is evident that the cam-plate and rack will make one forward and return movement each time a knot is tied, and that consequently the parts will be restored to their first position after the formation of a knot, ready to repeat the operation on the bands of the next bundle. The hook M′ will also be returned to the position M″, Fig. 21, where the point of the hook is engaged with the holder $r'$, ready to give the holder and cutter a partial rotation to sever and hold the cords for the next bundle. The direction of the rotation of the holder and cutter is represented by the arrows in the various drawings. The upper holder, Q', will also be opened by the cam k'', which operates the cutter and holder, so as to receive and grasp the band of the next bundle. A spring, N', Fig. 26, attached to the connection Y', may be employed to insure the engagement of the hook M' with one of the points of the holder r'. The position of the hook M' at the end of its travel is represented at M'''', Fig. 21.

Figures 12, 34:
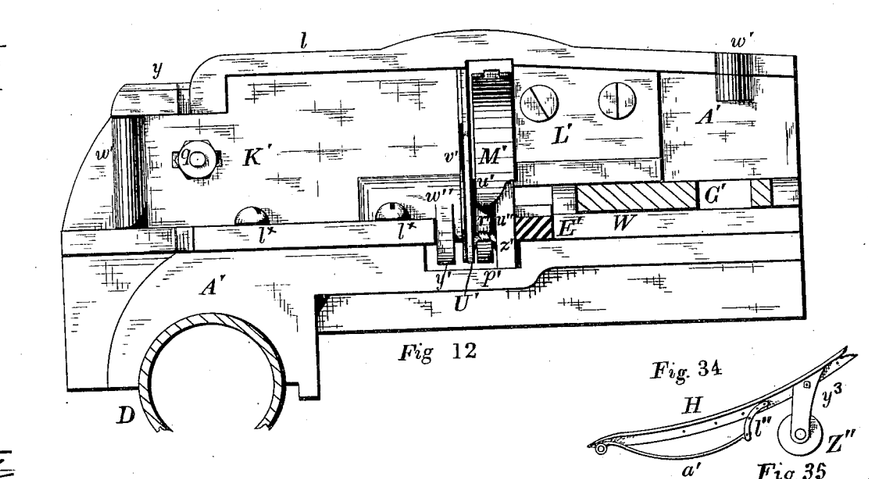
Fig. 12 is a side elevation of the knot-tyer case as seen from the left hand in Fig. 9.
Fig. 34 represents a modified form of the grain-elevating teeth.
Figure 14:
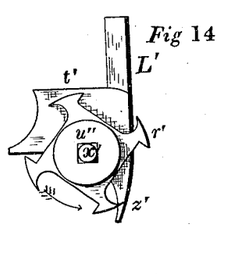
Fig. 14 is an end view of the cord holder.

The spindle x' of the cutter and holder revolves in suitable bearings in the rear end of the side plate, K', and the forward end of angle-piece L', Figs. 9, 12, and 14. The upper side of the inwardly-projecting portion t' of the angle-piece serves as a guide to the hook M' during its reciprocation.

Figure 13:
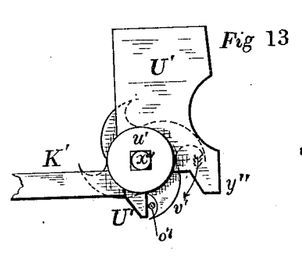
Fig. 13 is an end view of the cord-cutting mechanism.

Between the holder r' and the plate U' and the arm z', on each side of the holder, are placed the washers u' u'', Figs. 12, 13, and 14, which may be of different thicknesses to suit different sizes of cord. The side plate, K', is readily removed by taking out the screws l× l×, in which case the cutter and holder may be detached from the knot-tyer casing, and the washers u' u'' changed by substituting thicker or thinner ones in their places to adapt the knot-tyer to different sizes of cord.

The washers should be of such a thickness as to keep the holder separated from the plate U' and the arm z' to such an extent as to compress the cord firmly when drawn between these parts by the rotation of the holder.

The use of the washers u' u'' renders the knot-tyer adjustable to any size of cord which it may be desired to use on the machine. A boss, w'', Fig. 12, is placed on the side of the side plate, K', to afford strength to the bearing or socket in which the holder-spindle x' revolves. The arm y', projecting downward, prevents the cord from accidentally slipping outward, and also prevents the short portions of cord severed by the holder from finding their way into the needle-bar channel.

Above the cutter the plate U' is separated from the inwardly-projecting arm q' of the side plate, K', by a plate of the same thickness as the cutter, (see Figs. 9 and 12,) through which the upper end of the plate U' is fastened to the arm q' by rivets or screws. An arm, y'', Figs. 13 and 21, projects inward and downward for the purpose of guiding the cord into the cutter and holder.

In Figs. 32 and 33 I have represented a modification of the holder, having for its object to permit the passage of knots or other inequalities in the cord through between the holder and the holding-plates on each side thereof. On each side of the holder r' are placed the plates s³ and s⁴, which are held up against the washers u' u'', between them and the holder, by the springs t³ t⁴, located in suitable recesses in the side plates of the knot-tyer case. The cutter V' is placed next to the plate s³, which is sharpened for the purpose of severing the cord. The plates s³ s⁴ embrace the spindle x' by an opening sufficiently large to permit the rotation thereof. (See Fig. 33.) Suitable flange-collars z³ z⁴ are placed on each side of the plates. In operation, the plates s³ s⁴ yield laterally on each side of the holder, as represented in the dotted lines in Fig. 32, for the purpose of permitting the passage of knots or other irregularities on the cord through between the plates and the holder.

In Fig. 34 I have represented a device for preventing the points of the grain-elevating teeth from entering the ground, consisting of a carrying-wheel, Z'', located in rear of the shoe a' and attached to a rib on the under side of the tooth H by an arm, y³, which may be adjusted in position on the tooth by a bolt and a series of holes. The distance at which the point will run above the ground is determined by the position of the roller Z''. This device may be employed in high stubble, where the cut grain rests on it at some distance above the ground.

In Fig. 35 I have represented a modified device for elevating the grain over the point of the teeth. It consists of a movable point, v⁴, pivoted to the front end of the tooth, so that it may play up and down, as indicated by the dotted lines in the figure, to accommodate itself to the irregularities of the ground over which it passes. The movable point v⁴ runs under the grain and picks it up, so that it is carried back on the teeth by the forward motion of the same.

In order to support the overhanging reel-shaft G, I employ a frame, Q R T S. From the box on the reel-shaft in which the needle-bar reciprocates I extend upward a rod, Q, fastened to the end of a horizontal brace, R, which extends over the main frame and driving-wheel, and is secured to the frame by the vertical standards T S. By means of adjusting-screws on the standards the position of the reel may be controlled.

In the figures I have represented the fingers of the gaveling-reel F as offset from the center of the shaft G, so as to permit the passage of the binding-arm below the gavel. It is evident, however, that the same result may be attained by the use of radial fingers projecting outward from the shaft G, the needle-bar being arranged to slide backward and forward underneath the shaft.

Instead of the rib V', Fig. 11, on the point of the needle-bar, a lug, V'', Fig. 10, may be attached to the same, for the purpose of bringing the cord within the path of the rotation of the holder and cutter.

Instead of the rock-shaft J' and pedal V, any suitable device may be employed for automatically disconnecting the binding mechanism from the driving-shaft after it has bound a bundle.

The plate m' may be arranged to slide lengthwise on the under side of the cap l, for the purpose of permitting the passage of knots in the cord between it and the rotating hook B'.

I claim—

1. In combination with the grain-tooth H, the spur-wheels N and O, substantially as described.

2. In combination with the grain-teeth H, provided with spur-wheels O and N at their points, the intermittingly-rotating gaveler F, reciprocating needle-bar I, and the knot-tying mechanism, substantially as described.

3. The combination, in a grain-gleaning machine, of the main frame A, supported on driving-wheel B, the shaft D, projecting laterally from the frame in rear of the driving-wheel and provided on its outer end with the carrying-wheel E, the independently-movable grain-elevating teeth H, pivoted on the shaft D, the overhanging gaveler-shaft G, and reel F, the reciprocating needle-bar I, tying mechanism secured on the shaft D, and the operating mechanism, substantially as described, for operating the reel, needle-bar, and knot-tyer from the main driving-wheel, substantially as and for the purposes set forth.

4. In combination with the grain-elevating teeth H, pivoted on the rod D, the hand-lever I, rock-shaft D'', lifting-rod g', arm e, and ground-wheel E, substantially as described.

5. The combination of the grain-elevating teeth H, pivoted on the rod D, rock-shaft D'', lifting-rod g', arm e, ground-wheel E, intermittingly-rotating gaveler F, needle-bar I, and the knot-tying mechanism, substantially as described.

6. The combination of the main frame A, driving-wheel B, grain-elevating teeth H, intermittingly-rotating gaveler F, connected to main shaft by gearing c c' c'', reciprocating needle-bar I, driven from main shaft by gearing b b', crank h, pitman P, and lever M, and the knot-tying mechanism operated from the main shaft by mutilated bevel-gears k o, crank k', and suitable connecting mechanism, substantially as described.

7. The herein-described cord-holder, consisting of the rotating holding-disk r', having an intermittent rotary motion between suitable holding-jaws, capable of adjustment relatively to each other, in combination with the removable washers u' u'', substantially as described.

8. The combination of the pitman Y', provided with the hook M' for operating the holder and cutter, the rod I' and lever q'' for operating the upper holder, substantially as described.

9. The combination of the rotating knotting-hook B', hook r and latch p, sliding sleeve i', rack E', pinion D', cam-plate W, holder and cutter v' and r', and upper holding-jaw, Q', and suitable operating mechanism, substantially as and for the purposes set forth.

CORNELIUS R. BRINCKERHOFF.

Witnesses:
JAMES H. RICHMOND,
PARIS G. CLARK.